(12) United States Patent
Parekh et al.

(10) Patent No.: US 11,422,674 B2
(45) Date of Patent: *Aug. 23, 2022

(54) GRAPHICAL REPRESENTATION SHOWING INFORMATION TO A USER

(71) Applicant: VIACOM INTERNATIONAL INC., New York, NY (US)

(72) Inventors: Niral Parekh, New York, NY (US); Uta Knablein, New York, NY (US); Phil Kim, New York, NY (US); I-Wen Huang, New York, NY (US); Anna Fine, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,419

(22) Filed: Dec. 10, 2020

(65) Prior Publication Data
US 2021/0132774 A1 May 6, 2021

Related U.S. Application Data

(63) Continuation of application No. 16/000,416, filed on Jun. 5, 2018, now Pat. No. 10,891,016.

(51) Int. Cl.
| | |
|---|---|
| *G06F 3/0481* | (2022.01) |
| *G06T 17/05* | (2011.01) |
| *A63F 13/48* | (2014.01) |
| *A63F 13/35* | (2014.01) |
| *G06F 3/0484* | (2022.01) |
| *G06F 3/04817* | (2022.01) |
| *G06F 3/04815* | (2022.01) |
| *G06F 3/04842* | (2022.01) |

(52) U.S. Cl.
CPC .......... *G06F 3/04817* (2013.01); *A63F 13/35* (2014.09); *A63F 13/48* (2014.09); *G06F 3/04815* (2013.01); *G06F 3/04842* (2013.01); *G06T 17/05* (2013.01)

(58) Field of Classification Search
CPC ............. G06F 3/04817; G06F 3/04815; G06F 3/04842; G06T 17/05; A63F 13/35; A63F 13/48
See application file for complete search history.

(56) References Cited

U.S. PATENT DOCUMENTS

| | | | | |
|---|---|---|---|---|
| 7,447,999 | B1 * | 11/2008 | Robertson | ............... G06F 3/048 715/848 |
| 8,429,562 | B2 * | 4/2013 | Gourdol | .............. G06F 3/04817 715/837 |
| 10,552,745 | B2 * | 2/2020 | Jacobson | ................. G06N 5/04 |
| 10,579,695 | B2 * | 3/2020 | Sorg | ...................... G06F 40/134 |
| 10,891,016 | B2 * | 1/2021 | Parekh | .................... A63F 13/35 |

(Continued)

*Primary Examiner* — Daeho D Song
(74) *Attorney, Agent, or Firm* — Fay Kaplun & Marcin, LLP

(57) ABSTRACT

A device, system, and method generate a graphical interface including a map for a set of items. The method includes identifying the items in the set of items. For each item, the method includes measuring a usage characteristic for the item at a predetermined time and generating an icon for the item, a display characteristic of the icon based on the usage characteristic. The method includes generating the map including the icons.

16 Claims, 6 Drawing Sheets

(56) References Cited

U.S. PATENT DOCUMENTS

| | | | |
|---|---|---|---|
| 2007/0079255 A1* | 4/2007 | Gourdol | G06F 9/451 |
| | | | 715/815 |
| 2007/0209022 A1* | 9/2007 | Gourdol | G06F 9/451 |
| | | | 715/815 |
| 2013/0274021 A1* | 10/2013 | Novotny | A63F 13/792 |
| | | | 463/42 |
| 2016/0062635 A1* | 3/2016 | Feit | G06F 9/485 |
| | | | 715/765 |
| 2017/0017648 A1* | 1/2017 | Pearlman | G06F 16/9566 |
| 2017/0109677 A1* | 4/2017 | Ayyar | G06Q 30/02 |
| 2017/0353564 A1* | 12/2017 | Zhou | H04L 67/02 |
| 2019/0172098 A1* | 6/2019 | Lewis | G06Q 30/0269 |
| 2019/0369841 A1* | 12/2019 | Parekh | A63F 13/48 |
| 2021/0286510 A1* | 9/2021 | Tyler | G06F 3/04817 |

* cited by examiner

GRAPHICAL REPRESENTATION SHOWING INFORMATION TO A USER

BACKGROUND INFORMATION

Information may be viewed on a display device of a user device. For example, a user interface may be provided to display the information. The information may be shown in different manners using various user interfaces. When different items are being shown concurrently, the user may be presented with a corresponding number of options. For example, the items may be shown as various sized icons, in a list, in a tile view, etc. In one particular manner, the items may be shown on a graphical user interface in which non-text based representation is provided. For example, each of the items may be shown as an image, a shape, etc.

When the items are shown on a graphical user interface with a non-text based representation, information regarding the items may not be intuitively ascertained from viewing the graphical user interface. For example, the items may only be shown as an image or some identifying indicator of the item. Thus, to retrieve information of the item beyond the identity, a user may be required to request the information to be shown (e.g., provide a user input for the information to be viewable). In another example, a time delayed display may be shown when a user provides an input for a predetermined amount of time for an overlay window to appear including information about the item.

SUMMARY

The exemplary embodiments are directed to a method for generating a graphical user interface including a map for a set of items, comprising: identifying the items in the set of items; for each item: measuring a usage characteristic for the item at a predetermined time; generating an icon for the item, a display characteristic of the icon based on the usage characteristic; and generating the map including the icons.

The exemplary embodiments are directed to a map server generating a graphical user interface including a map for a set of items, the map server comprising: a transceiver configured to receive data corresponding to a usage characteristic for each of the items; and a processor generating the map by: identifying the items in the set of items; for each item: measuring the usage characteristic for the item at a predetermined time; generating an icon for the item, a display characteristic of the icon based on the usage characteristic; and generating the map including the icons.

The exemplary embodiments are directed to a non-transitory computer readable storage medium with an executable program stored thereon for generating a graphical user interface including a map for a set of items, wherein the program instructs a microprocessor to perform operations, comprising: identify the items in the set of items; for each item: measure a usage characteristic for the item at a predetermined time; generate an icon for the item, a display characteristic of the icon based on the usage characteristic; and generate the map including the icons.

DETAILED DESCRIPTION

Figure 1:
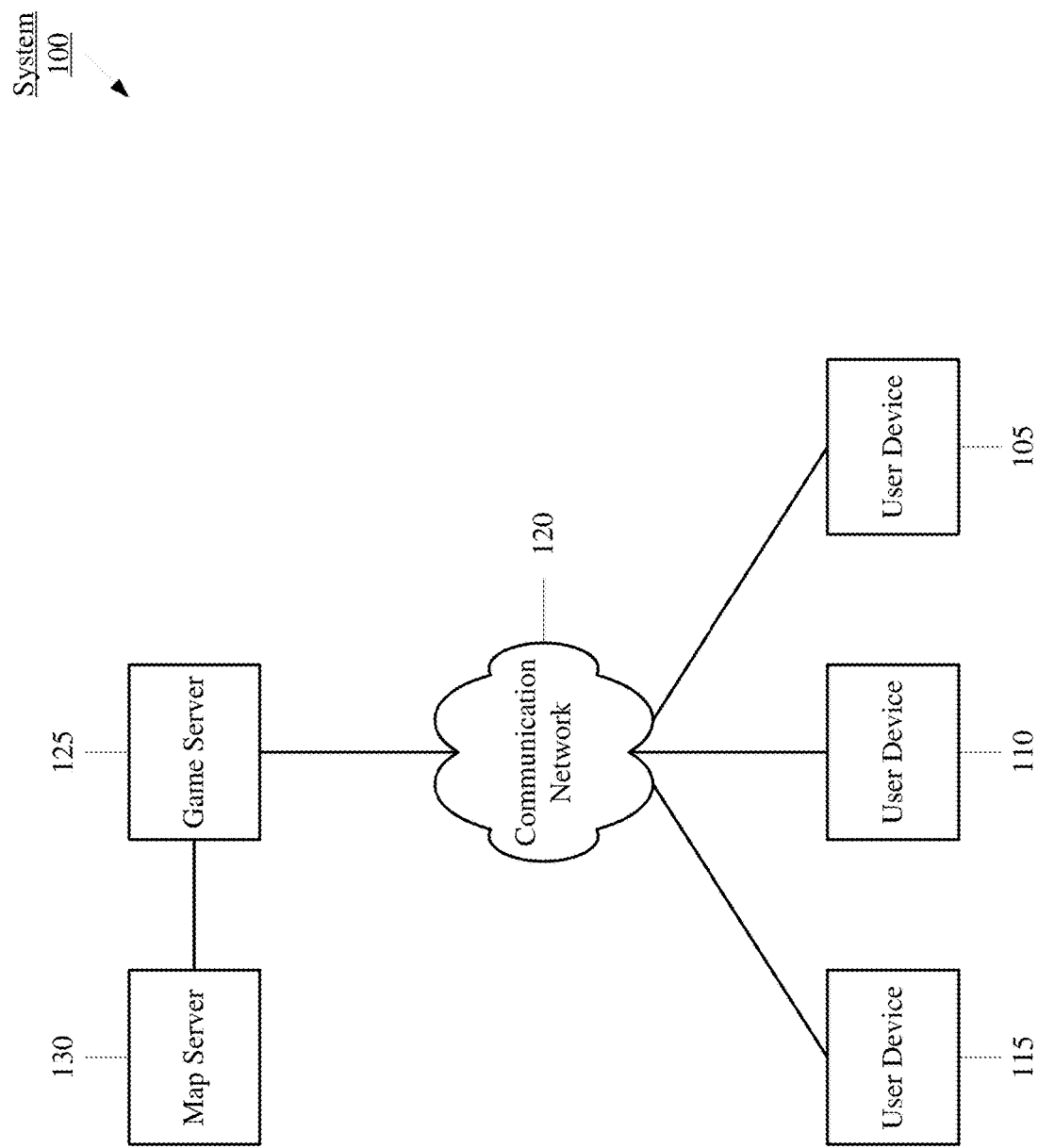
FIG. 1 shows an example system according to the exemplary embodiments.

The exemplary embodiments may be further understood with reference to the following description and the related appended drawings, wherein like elements are provided with the same reference numerals. The exemplary embodiments are related to a device, system, and method for generating a user interface including a graphical representation of items that include indicators representing different types of information in an intuitive manner for any user to understand the information being portrayed without requiring a legend or having knowledge beforehand. As will be described in further detail below, a map representing an entirety of the items may be shown with plots that represent groups of items, the plots including icons of each item in the group. The icons may include a height based indicator representing a usage of the item by a community of users. Using image based indicators, text based indicators, color/shape based indicators, and/or other types of indicators, the icons may also show other types of information beyond the usage by the community.

For illustrative purposes, the exemplary embodiments are described with regard to the items being games that may be played by the community of users. Thus, at a given time, there may be a subset of the community of users who are playing a particular game of the available games. However, the use of items being game applications is only exemplary. The exemplary embodiments may be utilized or modified for the items to represent any type or combination of types of applications in which a respective subset of the community of users may participate. For example, the application may be a chat application such that the items may be chat rooms; the application may be a forum application such that the items may be online forums; the application may be a news application such that the items may be news outlets; the application may be a streaming application such that items may be media content items; etc.

FIG. 1 shows a system 100 according to the exemplary embodiments. The system 100 may include a plurality of user devices 105, 110, 115 that is used by a respective user in playing an electronic game from a plurality of available games. The games may be provided or hosted over a communication network 120 by a game server 125. In selecting the game to play, the user devices 105-115 may be configured to show items representing the available games to the respective users in a graphical user interface according to the exemplary embodiments. The items may be information as stored on the user devices 105-115 or received from a remote source such as the game server 125. It is noted that the game server 125 may represent any remote source from which information of available items may be received by the user devices 105-115. For example, the game server 125 may represent another user device, a network component, a system, etc. The information may be exchanged between the components of the system 100 via the communications network 120. It should be noted that the system 100 is shown with connections between the components. However, those skilled in the art will understand that these connections may be through a wired connection, a wireless connection, interactions between integrated components or software subroutines, or a combination thereof.

The games may be played by the users of the user devices 105-115 in various manners through different components of the system 100. Thus, the users of the user devices 105-115 may represent the community of users. It is noted that the system 100 including three user devices 105-115 and (assuming only one user for each of the user devices 105-115) the community of users including three users is only exemplary. Those skilled in the art will understand that the games may be played by many users with more popular games potentially attracting a large number of users (e.g., thousands, tens of thousands, millions, etc.). Accordingly, the system 100 may include any number of user devices and accommodate any number of users. However, the number of users may be limited by hardware restrictions of the entity providing the game server 125 (e.g., a number of geographic servers that each support a maximum number of users at a given time, a maximum data capacity to store information of the users, etc.).

The user devices 105-115 may be any type of electronic component that is configured to communicate via a network and allow the users to play the game, e.g., mobile phones, tablet computers, desktop computers, smartphones, phablets, consoles, etc. For illustrative purposes, it may be assumed that all the games provided through the game server 125 may be accomplished through an Internet software platform (e.g., Java). Thus, the user devices 105-115 may only be required to have the software platform installed for the games to be played on the user devices 105-115. However, those skilled in the art will understand that there may be other manners of playing the game (e.g., installation of a specific program). With regard to gameplay and data exchange, according to an illustrative exemplary implementation, the game may be hosted on the game server 125. Thus, the user may log into the game to play the game being run by the game server 125.

The games provided by the game server 125 may be network games in which a connection between the user devices 105-115 and the game server 125 is utilized to exchange data. For example, when the game is hosted by the game server 125, the data exchange may involve transmitting display data (e.g., graphical user interface) from the game server 125 to the user devices 105-115 and transmitting input data (e.g., executing controls of a character) from the user devices 105-115 to the game server 125. The games may also be any type of game. For example, the games may be a brawl game, a first person shooter game, a third person perspective game, a role playing game, a side scrolling game, a text based game, a turn based game, a card based game, etc.

It is noted that the system 100 including a single game server 125 is only exemplary. In a first exemplary embodiment, the game server 125 may be configured to provide all of the games of the system 100. In a second exemplary embodiment, the game server 125 may be configured to provide a subset of the games of the system 100. Accordingly, the system 100 may include further game servers 125 to provide the remaining games of the system 100. In a third exemplary embodiment, the game server 125 may be configured to provide only one of the games of the system 100. Accordingly, the system 100 may include a corresponding number of game servers 125 for all of the games of the system 100. It is noted that each game may also include redundant game servers 125, particularly if a popularity for the game grows and additional servers are required to accommodate the number of users in the community playing the game.

In view of the user devices 105-115 being utilized to play the games provided by the game server 125, it is noted that the user devices 105-115 may be configured with the necessary hardware, software, and firmware to play the game. For example, the user device 105 may include a processor, a memory, a display device, a transceiver, etc. The game server 125 may also be configured with the necessary hardware, software, and firmware to provide the game to the user devices 105-115 as well as utilize playing profiles according to the exemplary embodiments.

It is also noted that the communications network 120 may be any type of network that enables information to be transmitted between the user devices 105-115 and the game server 125. For example, the communications network 120 may be a cable provider network, a satellite network, a terrestrial antenna network, the public Internet, a local area network (LAN), a wide area network (WAN), a virtual LAN (VLAN), a Wi-Fi network, a cellular network, a cloud network, a wired form of these networks, a wireless form of these networks, a combined wired/wireless form of these networks, etc. The communications network 120 may also represent one or more networks that are configured to connect to one another to enable the data to be exchanged among the components of the system 100. The communications network 120 may also include network components (not shown) that are configured to perform further functionalities in addition to providing a conduit to exchange data.

Prior to playing the game, the user devices 105-115 may be provided a user interface in the form of a map of the available games that may be played. In this manner, the users of the user devices 105-115 may select a game being shown on the map. Upon selecting a game, the game may be launched and the map may be replaced by a user interface corresponding to the selected game. As noted above, the map may represent a list of available games for the community of users to play where each game is represented as an icon included in a group represented as a plot in the map. The map may be generated via operations performed by a map server 130. Initially, the map server 130 being connected to the game server 125 is only exemplary. In performing the operations to generate the map, the map server 130 may be communicatively connected to the user devices 105-115 and/or the game server 125 via the communication network 120. It is noted that a single game may be represented in one or more plots on the map, particularly if the plots are grouped in different ways. Thus, a single game may be a plot in a first group of the map based on characters and also as a plot in a second group of the map based on game type.

The map according to the exemplary embodiments may be generated through different operations by components of the system 100. In a first example, the user devices 105-115 may be configured to generate the map based on data received from the map server 130. In this manner, the map server 130 may track usage of the games as well as other information which is packaged into corresponding data provided to the user devices 105-115. Accordingly, the user devices 105-115 may perform the operations to generate and assemble the map with the proper representations of the games. In a second example, the user devices 105-115 may be configured to show the map based on map display data received from the game server 125, the game server 125 being configured to generate the map for the games. Accordingly, the user devices 105-115 may only be required to receive the map display data and process the data to show the map to the users.

Figure 2:
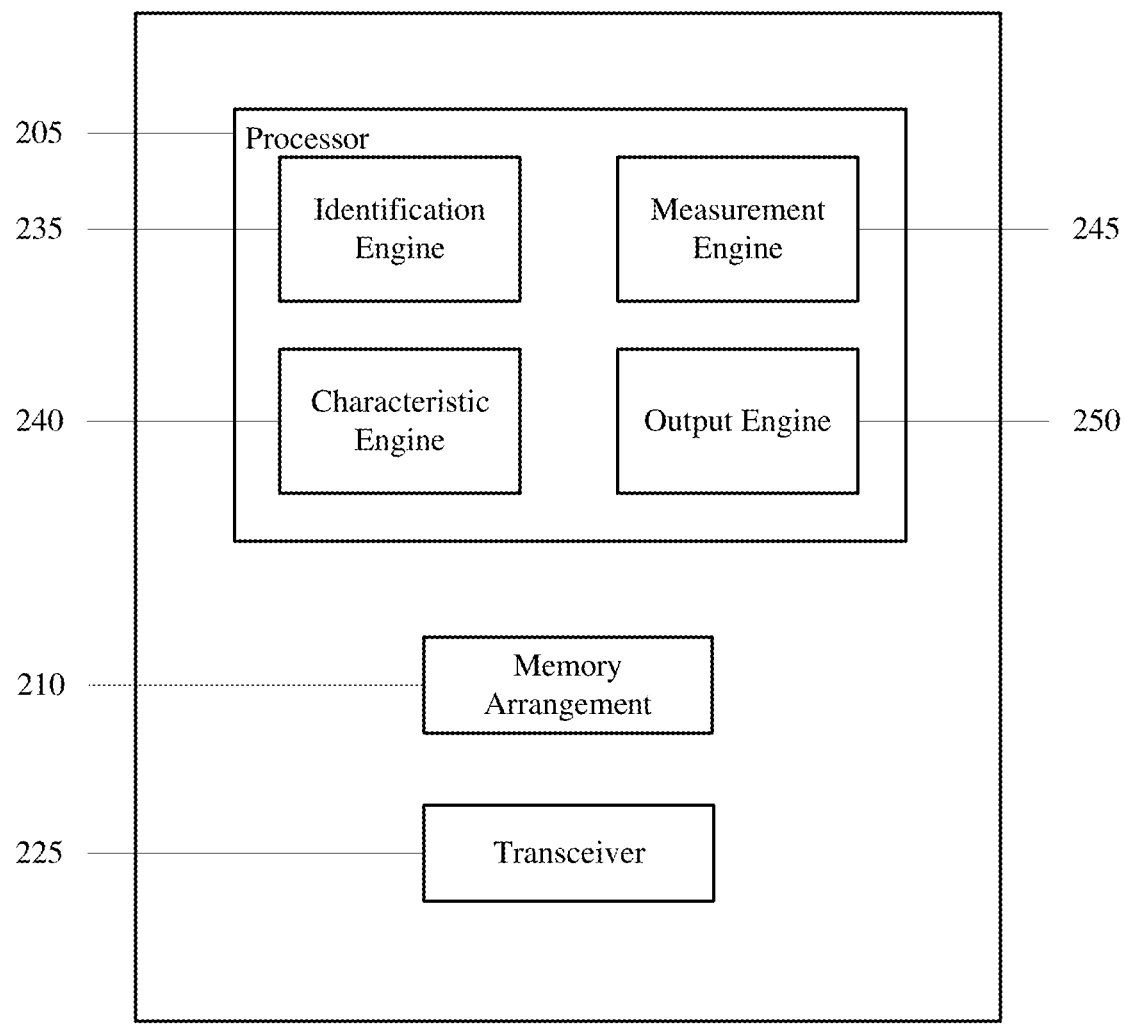
FIG. 2 shows an example map server of the system of FIG. 1 according to the exemplary embodiments.

As described above, the map server 130 may utilize information associated with games to generate the map including respective icons for the games, where the icons may also be grouped into plots on the map. FIG. 2 shows an exemplary map server 130 of the system 100 of FIG. 1 according to the exemplary embodiments. The map server 130 may provide various functionalities in generating the map. Although the map server 130 is described as a network component (specifically a server), the map server 130 may be embodied in a variety of hardware components such as a portable device (e.g., a tablet, a smartphone, a laptop, etc.), a stationary device (e.g., a desktop terminal), incorporated into the user devices 105-115, incorporated into a website service, etc. The map server 130 may include a processor 205, a memory arrangement 210, and a transceiver 225. It is noted that the map server 130 may include further components (e.g., a display device, an input and output (I/O) device, an imager, an audio I/O device, a data acquisition device, ports to electrically connect the map server 130 to other electronic devices, etc.). For illustrative purposes, the exemplary embodiments are described herein where the map server 130 generates the map and corresponding map display data is transmitted to the user devices 105-115. Also for illustrative purposes, the exemplary embodiments are described herein where the games are hosted by the game server 125.

The processor 205 may be configured to execute a plurality of applications of the map server 130. As will be described in further detail below, the processor 205 may utilize a plurality of engines including an identification engine 235, a characteristic engine 240, a measurement engine 245, and an output engine 250. The identification engine 235 may be configured to identify the available games being hosted by the game server 125. The characteristic engine 240 may be configured to identify corresponding characteristics of the games that may be tracked including usage. The measurement engine 245 may be configured to determine a value corresponding to the characteristics. The output engine 250 may be configured to generate the map based on the outputs of the identification engine 235, the characteristic engine 240, and the measurement engine 245.

It should be noted that the above noted applications and engines each being an application (e.g., a program) executed by the processor 205 is only exemplary. The functionality associated with the applications may also be represented as components of one or more multifunctional programs, a separate incorporated component of the map server 130 or may be a modular component coupled to the map server 130, e.g., an integrated circuit with or without firmware.

The memory 210 may be a hardware component configured to store data related to operations performed by the map server 130. For example, the memory 210 may store data received from the game server 125 regarding the various available games and usage related information. The transceiver 225 may be a hardware component configured to transmit and/or receive data with the game server 125 or via the communications network 120.

According to the exemplary embodiments, the map server 130 may generate a map of available games represented as icons selectable by the community of users to launch the game and join other users of the community already playing the game. The icons may be represented with intuitively identifiable indicators that illustrate a particular characteristic to the users viewing the map on the user devices 105-115. In a particular example, the icons may exhibit a dynamically adjustable height. The dynamically adjustable height may be used to indicate any number of characteristics of the game (e.g., popularity, newness, etc.).

Initially, the identification engine 235 may identify the available games being hosted by the game server 125. At any given moment, the game server 125 may be hosting any of a plurality of games that the entity associated with the game server 125 has designed or licensed. For example, the game server 125 may have access to one hundred different games. All one hundred different games may be represented on the map. However, in other exemplary embodiments, only select ones of the total games that are available for play may be represented on the map. In addition, old games may be removed (from the total games or the available games), new games may be added, promotional games (e.g., temporary or short-lived) may be added and subsequently removed, etc. The identification engine 235 may determine which games are to be included in the map being generated corresponding to a relative time that the map would be displayed on a user device that is requesting the map. The identification engine 235 may identify the games through a variety of mechanisms. For example, the identification engine 235 may query the game server 125 and request the identities of the games be provided. In another example, the identification engine 235 may monitor an activity of the game server 125 (e.g., particularly if separate game servers 125 are used for respective games).

The characteristic engine 240 may identify corresponding characteristics of the games that may be tracked including usage while the measurement engine 245 may determine a value corresponding to the characteristics. Each of the games may include a set of characteristics that may be tracked. In a first example, all of the games may include certain characteristics that are tracked. For example, the characteristics may include a name or identity, an association to other games or group, a usage, a time relating to when the game has been available or added or will be removed, etc. For the association, the games may have associated keywords, characters, or other identifying marker which may be used to determine how the game may be linked with other games or a group. Thus, if the game has identifying markers that satisfy a predetermined similarity threshold for inclusion into a group, the game may be associated with that group. Otherwise, the game may be placed into a new group. With regard to the usage and time, the measurement engine 245 may be used to determine the corresponding values for these characteristics. In determining a relative value for such characteristics, a corresponding indicator may be used to represent this information in the icons for the games. In a second example, the games may further include respective characteristics that may be tracked. For example, based on the type of game, a particular characteristic may be identified for the game (e.g., a high score, a highest level reached, etc.).

The output engine 250 may generate the map based on the outputs of the identification engine 235, the characteristic engine 240, and the measurement engine 245. As noted above, the map may include a plurality of plots that represent a group of games. Thus, based on the output of the characteristic engine 240, the output engine 250 may determine how the games are grouped into a corresponding plot. The map may also include icons within each plot that represent the individual games in the group. Thus, based on the output of the characteristic engine 240 and the measurement engine 245, the output engine 250 may determine how the icons are to be shown, particularly with the corresponding indicators (which will be described in further detail below).

The output engine 250 may generate the map in a variety of manners. As used herein, the map according to the exemplary embodiments may be generated substantially similar to a road map. Thus, the map may include the plots and roads that separate the plots from one another. The plots may be included in the map using any shape (e.g., circular, polygonal, or a combination thereof). The icons may be included in the plot also using any shape (e.g., corresponding to the shape of the plot). In a particular implementation, the icons may imitate structures or buildings on the map. Accordingly, a two-dimensional map may include three-dimensional representations of the icons with the icon exhibiting a height to appear as if being raised relative to the road surface of the map. To further simulate a road map, the map may include aesthetic features (e.g., trees, traffic signs/lights, lane markings, filler plots imitating a field/park, etc.) at predetermined or dynamically selected locations. It is noted that the use of the road map is only exemplary and other two-dimensional maps including three-dimensional representations may be used.

The icons may be distributed in the plot in an organized manner which may be predetermined or dynamically determined. The plot may also indicate an identity of the group, the icons being arranged to maintain a visibility of the group identity. Each icon may also indicate an identity of the game, the icons being arranged to maintain a visibility of the game identity. The icons may also be selectable (e.g., using a mouse cursor, a finger on a touch device, etc.) to launch the corresponding game and replace the map with a user interface of the game.

With regard to the indicators, the output engine 250 may utilize a range of different types of indicators. In a first example, the identifying indicator for the group and/or the game may include an image, text, color, or a combination thereof such that a user viewing the identifying indicator may immediately recognize the identification. For the icons, the identifying indicator may also be shown on a longitudinal side or face that may be available from a height being exhibited on the icon.

In a second example, a height of an icon corresponding to the game may be dynamically modified based on usage (or other criteria such as newness). Specifically, a number of users who are currently playing a game (or have subscribed, or have the game available for play, or another criteria with regard to usage) may correspond to a height that the icon is to exhibit on the map. For example, an icon having a relatively high height may indicate that a relatively large number of users in the community are currently playing the game. In contrast, an icon having a relatively low height may indicate that a relatively small number of users in the community are currently playing the game. In fact, the icon being level with the road surface may indicate that there are little to no users currently playing the game. The height used for the icons may include a predetermined minimum and/or a predetermined maximum height. For example, a predetermined minimum height may be used such that a side surface or face may still be visible for information to be displayed. In another example, a predetermined maximum height may be used such that icons or side surfaces/faces are prevented from being hidden.

In a third example, the side surfaces and/or the faces may include information about the game. For example, a game having a large number of users (e.g., greater than a predetermined threshold) may include a "Popular" indicator. In another example, a game having a large change in the number of users (e.g., both increase or decrease) may include a corresponding indicator for this change. In a further example, the indicator may indicate time related information (e.g., a "New" indicator for newly added games, a "Promo" indicator for a promotional or temporarily added game, etc.).

In a fourth example, the indicator may utilize a color scheme to indicate a particular characteristic. For example, a red color may indicate that the game is unavailable while a green color may indicate that the game is available. A yellow color may indicate that the game may soon become available or unavailable. In another example, the color scheme may be used to indicate a queue or wait time associated with joining the users who are currently playing the game.

It is noted that the map may be shown in various manners as well. For example, the map may be used in a static manner where the map is generated and fixed. Thus, the icons and plots may be shown in the map in a predetermined manner and only in this manner (although still dynamic with regard to the indicators). In another example, the map may be generated and shown in a rotatable manner to enable the user to rotate the map as desired. When rotated, the icons and plots may dynamically adjust a view of the indicators, particularly if image and/or text based indicators are used.

Figure 3:
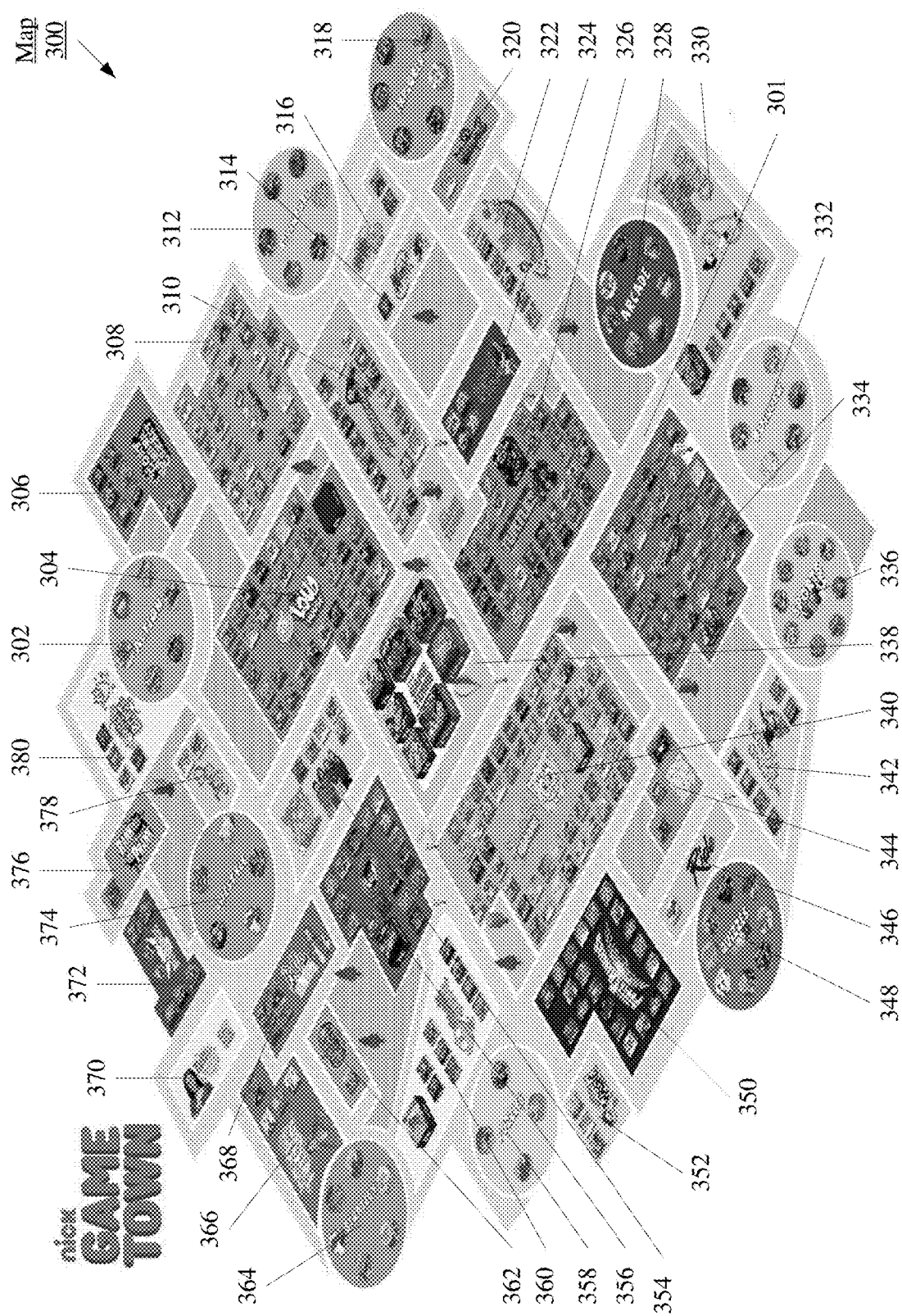
FIG. 3 shows an example map created using the map server of FIG. 2 according to the exemplary embodiments.

FIG. 3 shows an example map 300 created using the map server 130 of FIG. 2 according to the exemplary embodiments. As noted above, the map 300 may be substantially similar to a road map including roads 301 and a plurality of plots 302-380. It is noted that the orientation, arrangement, etc. of the map 300 is only exemplary. For example, the roads 301 may extend in different ways, the plots 302-380 may have different shapes, the plots 302-380 may be placed in different locations, etc. In another example, the use of forty plots 302-380 and the use of the icons therein are only exemplary as there may be any number of games and groups. In fact, if a game qualifies to belong to more than one group, an icon for the game may be included in each of the corresponding groups.

Figure 4:
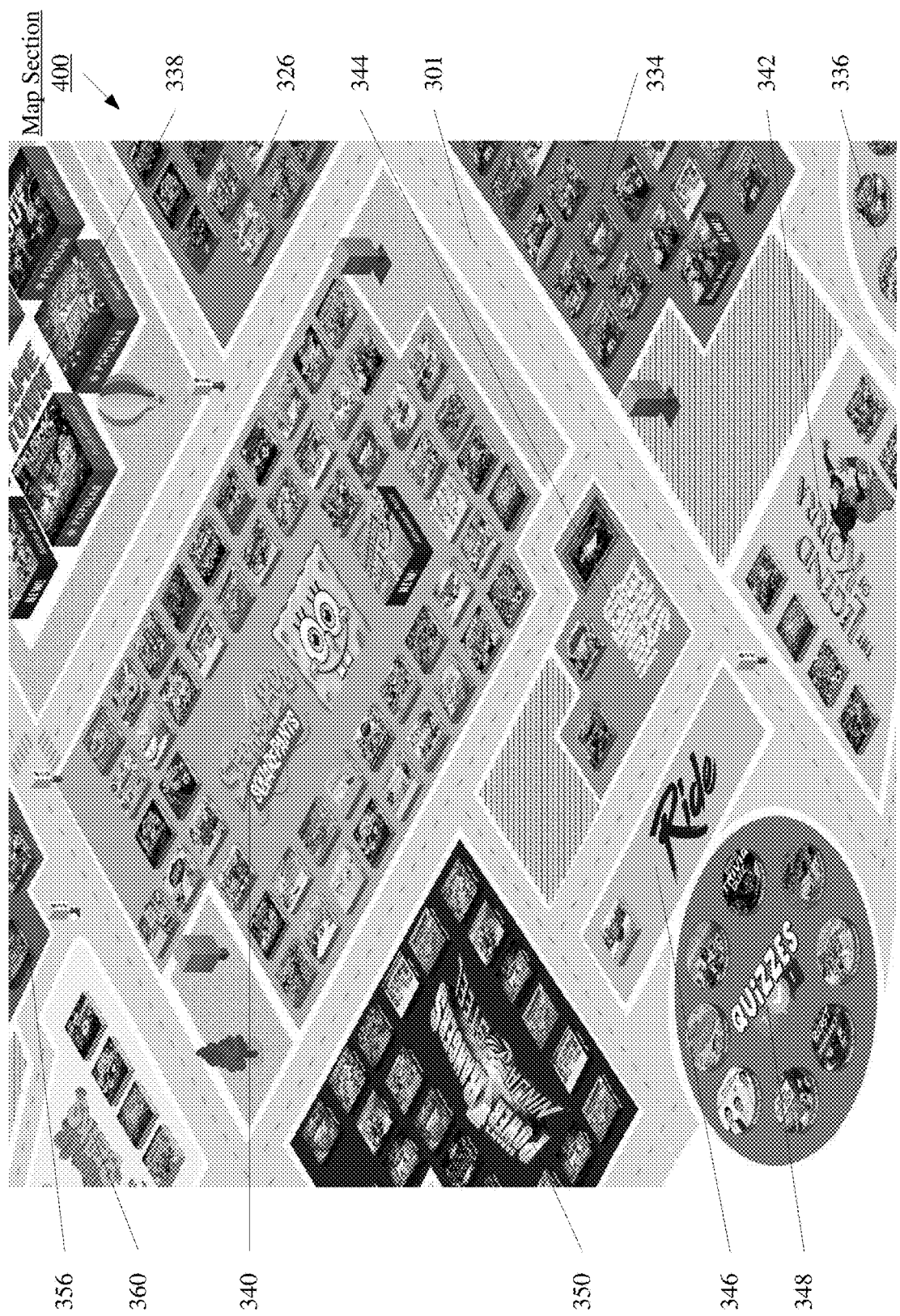
FIG. 4 shows an example map section of the map of FIG. 3 according to the exemplary embodiments.

FIG. 4 shows an example map section 400 of the map 300 of FIG. 3 according to the exemplary embodiments. Specifically, the map section 400 may correspond to a rectangular section of the map 300 including some of the roads 301, the plots 326, 334, 336, 338, 340, 342, 344, 346, 348, 350, 356, and 360. The map section 400 provides a more detailed view of how the plots and icons may have different shapes with the roads 301 traversing around the plots.

Figure 5:
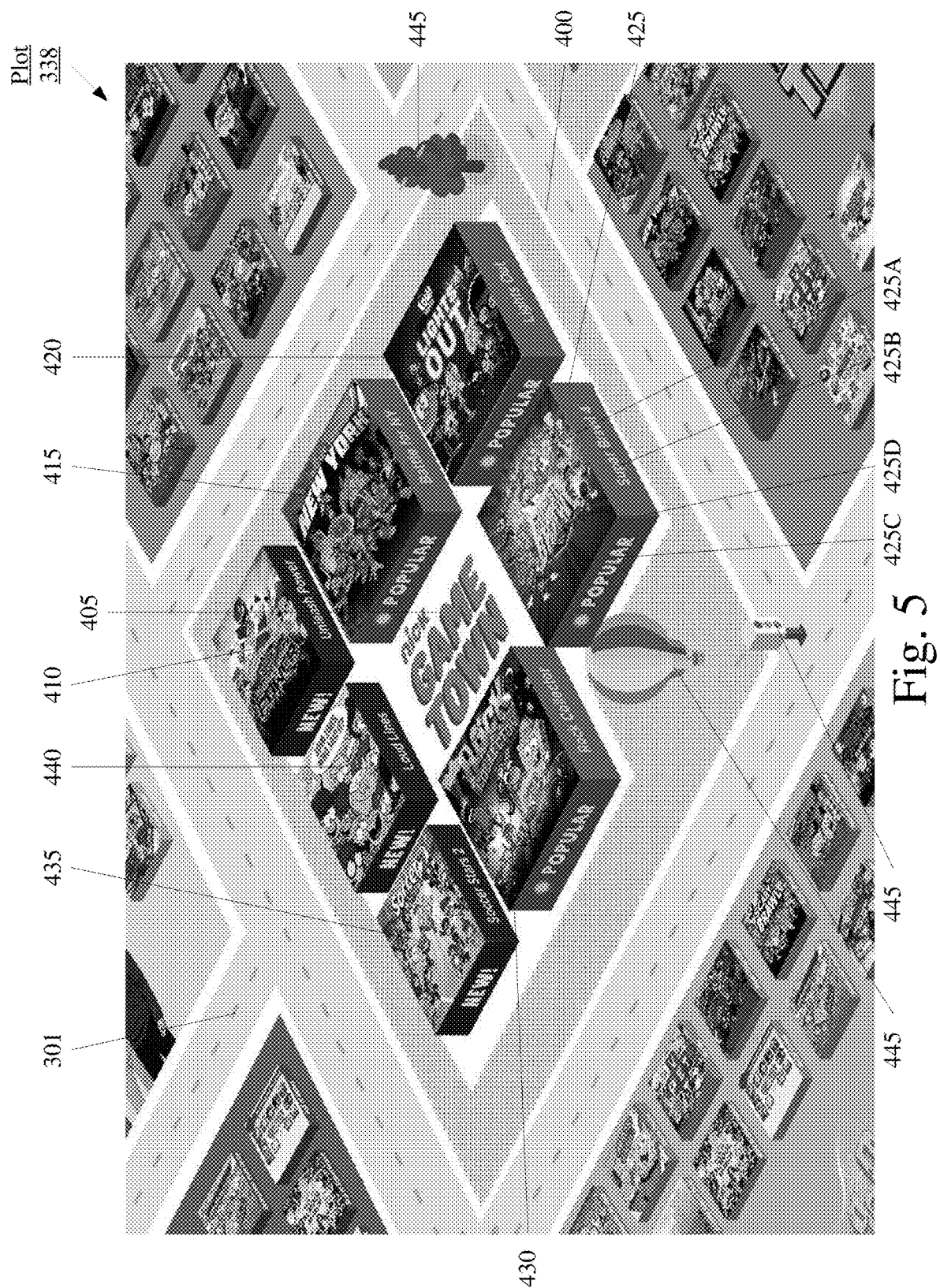
FIG. 5 shows an example plot in the map of FIG. 3 according to the exemplary embodiments.

FIG. 5 shows an example plot 338 in the map 300 of FIG. 3 according to the exemplary embodiments. The plot 338 may have a substantially central position in the map 300. According to a particular implementation, the plot 338 may provide an initial plot or portion of the map 300 that is shown to the user upon being provided the map 300. The icons included in the plot 338 may also be personalized for the user.

The view of the plot 338 provides even further details, particularly of features of the plot and icons. As shown, the plot 338 may include a boundary 400. In this exemplary embodiment, the boundary 400 may be substantially square shaped, however, any shape may be exhibited (e.g., a circle as shown in plot 364, a poly as shown in plot 358, a combination shape as shown in plot 354, etc.). The plot 338 may also include an identifying indicator 405. The identifying indicator 405 may be centrally disposed, however, any location may be used (e.g., along a side as shown in plot 370, along a bottom as shown in plot 344, etc.). The plot 338 may also include aesthetic features 445 (e.g., traffic light, tree, weather balloon, etc.).

The exemplary plot 338 includes seven icons 410-440, although, again, the plot 338 may include any number of icons. The icons 410-440 may circumscribe the identifying indicator 405, however, any arrangement may be used (e.g., spread out as shown in plot 358, bunched on a side as shown in plot 366, etc.). The icons 410-440 may also have a shape corresponding to the shape of the plot 338 (e.g., a square), however, any shape may be used (e.g., circular shape as shown in the icons of plot 348).

Each of the icons 410-440 may include various indicators that show different characteristics associated with the corresponding game. For illustrative purposes, the icon 425 will be described. As shown, the icon 425 may include four different characteristics that are shown with indicators. In a first example, the icon 425 may include an identifying indicator 425A that shows an image of the game and a title in text. In a second example, the icon 425 may include a further identifying indicator 425B that shows the title in text. In a third example, the icon 425 may include a relative usage indicator 425C. In this instance, there may be a predetermined minimum number of users currently playing the game such that the relative usage indicator 425C shows "Popular". In a fourth example and as described above, the icon 425 may include a usage indicator 425D represented with the height of the icon. As shown, since the game corresponding to the icon 425 is popular, the icon may have a relatively high height (e.g., relative to the icons 410, 435, 440 within the plot 338 or even the icons of the neighboring plots). Thus, the actual usage of the game being currently played by users may be illustrated with the usage indicator 425D via the height.

It is noted that further indicators are also being shown in the plot 338. In a first example, instead of the relative usage indicator 425C, the icons 410, 435, 440 may show a time indicator. In this instance, the games corresponding to the icons 410, 435, 440 may have been recently added (e.g., within a predetermined duration of time relative to a current time). Thus, the time indicator may show "New". In a second example, a relative popularity or total users in the group may modify the manner in which icons are shown. As shown, although not to scale, the icons in the plot 338 are shown as larger than the icons of the neighboring plots. Accordingly, a modification to the map 300 may utilize different sizes for the icons with a more popular group using larger icons. A substantially similar feature may be provided for a plot, icon, etc. that may be determined to be of interest or relevance to a specific user. In a third example, the icons in a first plot may represent a game as a whole whereas a second plot in the map 300 may represent the game and individual manners of playing the game. Thus, the icons in the second plot may represent how users playing the game break down into the different game play types. In a fourth example, the icons may be given a particular shape. In a particular scenario, the plot/icons may use a polygonal shape when related to a particular program, show, character, etc. or may use a circular shape when related to a type of game. A combination shape may be used when a combination of these categorizations is used.

Figure 6:
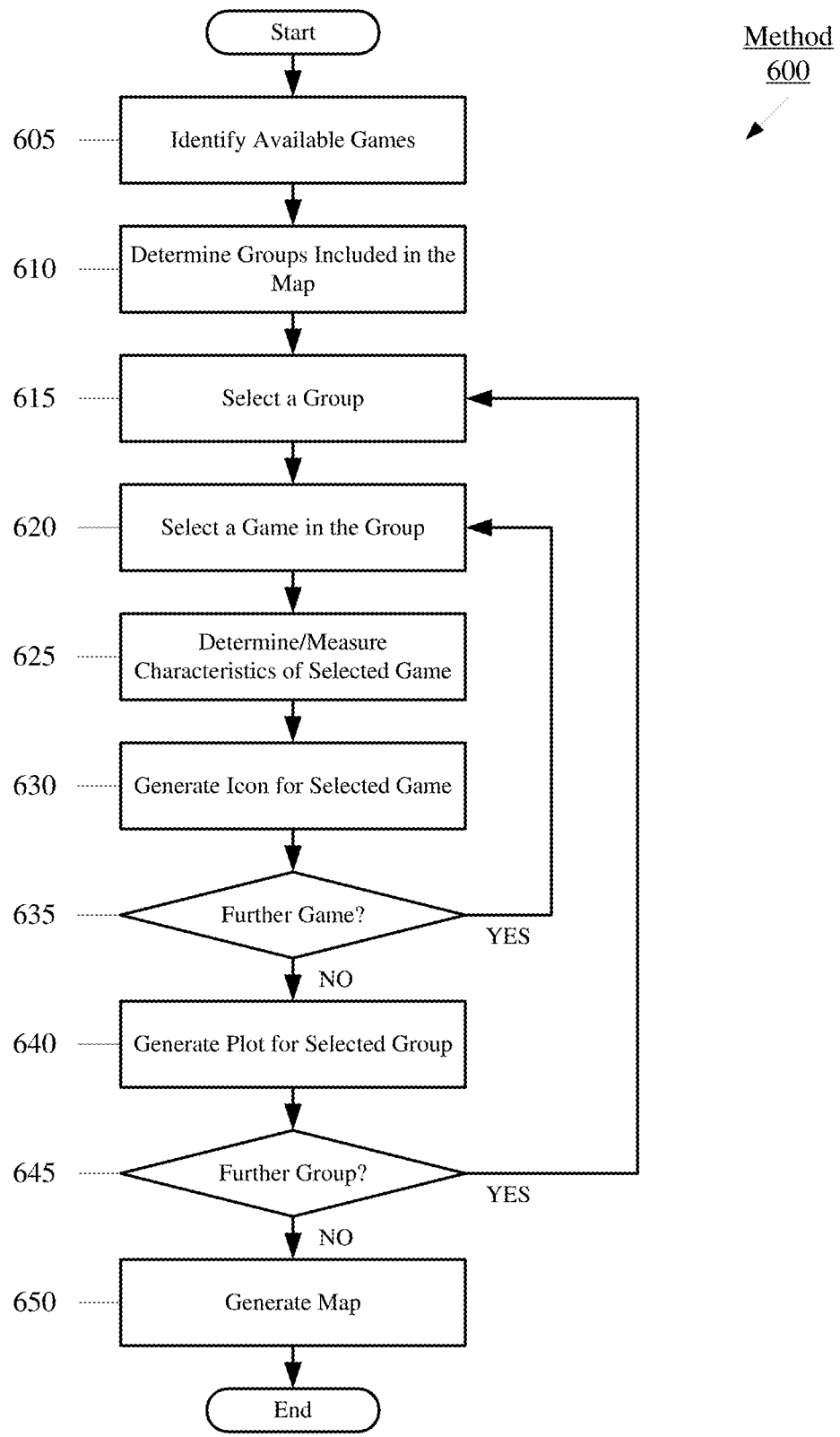
FIG. 6 shows a method of generating a map according to the exemplary embodiments.

FIG. 6 shows a method 600 of generating the map 300 according to the exemplary embodiments. The method 600 relates to the process by which the map server 130 performs operations associated with generating a map of a plurality of games available to be played by users of the user devices 105-115. The method 600 is described from the perspective of the map server 130 generating the map and providing the map to a requesting one of the user devices 105-115. The method 600 will be described with regard to the map 300 of FIG. 3 and portions of the map 300 shown in FIGS. 4 and 5.

In 605, the map server 130 identifies the available games being hosted by the game server 125. As described above, the map server 130 may identify the available games by querying the game server 125, monitoring activity of the game server 125 (especially when a plurality of game servers 125 are used by the system 100), etc. The map server 130 may also monitor the user devices 105-115 to identify games that are being currently played. As noted above, the map server 130 may utilize the identification engine 235 for this operation.

In 610, the map server 130 determines the groups that are to be included in the map. As described above, the characteristic engine 240 may identify the various characteristics that may be tracked for the games. Certain characteristics may be used for all of the games such as identifying information and association information. Based on the association information (e.g., via keywords, markers, etc.), based on the identified available games, the map server 130 may determine the groups that are to be created.

In 615, the map server 130 selects one of the groups. In 620, the map server 130 selects a game in the group. In 625, the map server 130 determines and measures characteristics of the selected game. As noted above, the map server 130 may use the characteristic engine 240 and the measurement engine 245 to perform these operations. The characteristics that may be measured may include, for example, a name or identity, an association to other games or group, a usage, a time relating to when the game has been available or added or will be removed, etc. Based on the determined/measured characteristics of the selected game, in 630, the map server 130 via the output engine 250 generates a corresponding icon to show the determined/measured characteristics. For example, an identifying indicator may be included in the icon. In another example, a height of the icon may be adjusted to reflect a current usage of the game by the users in the community.

In 635, the map server 130 determines if there are any further games in the group. If there is at least one further game in the group, the map server 130 returns to 620. The map server 130 may repeat 620-635 until all games have been processed and corresponding icons have been generated. Once all the games of a group have icons, in 640, the map server 130 via the output engine 250 generates the plot for the selected group. For example, a shape of the plot may be selected to accommodate an identifying indicator for the group, the icons to be included in the plot, etc. In another example, a location in the map may be selected.

In 645, the map server 130 determines if there are any further groups to be processed. If there is at least one further group, the map server 130 returns to 615. The map server 130 may repeat 615-645 until all groups have been processed and corresponding plots have been generated. Once all the groups of the map have plots, in 650, the map server 130 via the output engine 250 generates the map for the groups. For example, a cumulative knowledge of the generated plots/icons may be used to determine an arrangement to be used in the map. In another example, the map server 130 may determine how further features such as roads 301 or aesthetic features 445 are to be included.

The exemplary embodiments provide a device, system, and method for generating an interactive graphical user interface as a map for a plurality of selectable items such as games. The map may include a plurality of icons corresponding to the selectable items. The icons may be generated and represented on the map such that information regarding characteristics of the selectable items are viewable and intuitively recognizable. Specifically, a height of the icon may be dynamically adjusted to identify a current usage of the selectable item.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system such as Microsoft Windows, a Mac platform and MAC OS, a mobile device having an operating system such as iOS or Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method for generating, at a server, a graphical user interface (GUI) for execution on a plurality of user devices, the GUI including a map for a set of applications in a gaming environment executable on the plurality of user devices to facilitate interactions between a corresponding user device and a game server, the method comprising:
   measuring a number of users currently interacting with a first application of the set of applications across the plurality of user devices;
   generating a first icon for the first application, including a first display characteristic of the first icon being based on the measured number of users currently interacting with the first application;
   measuring a number of users currently interacting with a second application of the set of applications across the plurality of user devices;
   generating a second icon for the second application, including a second display characteristic of the second icon being based on the measured number of users currently interacting with the second application;
   generating the map including the first icon having the first display characteristic and the second icon having the second display characteristic; and
   displaying the generated map on a first one of the plurality of user devices executing the GUI.

2. The method of claim 1, wherein the map is arranged as a road map with a plurality of plots, each plot including one application of the set of applications.

3. The method of claim 2, wherein the map includes roads extending between the plots.

4. The method of claim 2, wherein the map includes aesthetic features to simulate the road map.

5. The method of claim 2, wherein the applications collected into groups geographically located on the map based on traits of the applications.

6. The method of claim 5, wherein each of the groups is represented in a corresponding one of the plots.

7. The method of claim 1, further comprising:
   determining an identifying characteristic for each of the first and second applications,
   wherein generating the first icon includes the identifying characteristic of the first application and generating the second icon includes the identifying characteristic of the second application.

8. The method of claim 7, wherein the identifying characteristic for each of the first and second applications includes one of an image of the corresponding one of the first and second applications, a text identification of the corresponding one of the first and second applications, a title of the corresponding one of the first and second applications.

9. The method of claim 1, further comprising:
   determining at least one of a relative usage characteristic, a time characteristic, or an availability characteristic for each of the first and second applications,
   wherein generating the icon for the first application includes one of the relative usage characteristic, the time characteristic, and the availability characteristic for the first application.

10. The method of claim 1, wherein the applications in the set of applications include electronic games playable on the user devices.

11. The method of claim 10, wherein, for a selected one of the games, the usage characteristic is a total number of the user devices on which the selected game is either currently playing or has been played during a predetermined time period.

12. The method of claim 10, wherein each of the first and second icons is selectable to launch a corresponding one of the games.

13. The method of claim 1, wherein the display characteristic for the first icon includes one of a height of the first icon, a color of the first icon, a shape of the first icon, or a combination thereof.

14. A map server configured to generate a graphical user interface (GUI) including a map for a set of applications in a gaming environment executable on a plurality of user devices to facilitate interactions between a corresponding user device and a game server, the map server comprising:
   a transceiver configured to receive data corresponding to a usage characteristic for each application in the set of applications; and
   a processor generating the map by:
      measuring a number of users currently interacting with a first application of the set of applications across the plurality of user devices;
      generating a first icon for the first application, including a first display characteristic of the first icon being based on the measured number of users currently interacting with the first application;
      measuring a number of users currently interacting with a second application of the set of applications across the plurality of user devices;
      generating a second icon for the second application, including a second display characteristic of the second icon being based on the measured number of users currently interacting with the second application;
      generating the map including the first icon having the first display characteristic and the second icon having the second display characteristic in a configuration for display at the plurality of user devices; and
      displaying the generated map on a first one of the plurality of user devices executing the GUI.

15. The map server of claim 14, wherein the map is arranged as a road map with a plurality of plots, each plot including at least one of the applications in the set of applications.

16. A non-transitory computer readable storage medium with an executable program stored thereon for generating a graphical user interface (GUI) including a map for a set of applications in a gaming environment executable on a plurality of user devices to facilitate interactions between a corresponding user device and a game server, the program instructing a microprocessor to perform operations, comprising:

measuring a number of users currently interacting with a first application of the set of applications of the set of applications across the plurality of user devices;

generating a first icon for the first application, including a first display characteristic of the first icon being based on the measured number of users currently interacting with the first application;

measuring a number of users currently interacting with a second application of the set of applications of the set of applications across the plurality of user devices;

generating a second icon for the second application, including a second display characteristic of the second icon being based on the measured number of users currently interacting with the second application;

generating the map including the first icon having the first display characteristic and the second icon having the second display characteristic in a configuration for display at the plurality of user devices; and displaying the generated map on a first one of the plurality of user devices executing the GUI.

* * * * *